US005648305A

United States Patent [19]
Mansfield et al.

[11] Patent Number: 5,648,305
[45] Date of Patent: Jul. 15, 1997

[54] PROCESS FOR IMPROVING THE EFFECTIVENESS OF PROCESS CATALYST

[76] Inventors: William D. Mansfield, 11543 Blackwater Rd., Baker, La. 70714; Todd L. Foret, 107 N. Morein St., Ville Platte, La. 70586; Hubert P. Vidrine, Rt. 1, Box 191, Opelousas, La. 70570

[21] Appl. No.: 656,004

[22] Filed: May 24, 1996

Related U.S. Application Data

[63] Continuation of Ser. No. 252,012, Jun. 1, 1994, abandoned.

[51] Int. Cl.$^6$ .................... B01J 38/50; B01J 38/60; C10G 35/04
[52] U.S. Cl. .................. 502/27; 502/28; 502/29; 208/134; 208/140
[58] Field of Search ................ 502/27, 20, 55, 502/28, 29; 208/140, 134

[56] References Cited

U.S. PATENT DOCUMENTS

| | | | |
|---|---|---|---|
| 2,336,598 | 12/1943 | Downing | 44/73 |
| 2,446,969 | 8/1948 | Welch | 260/666.5 |
| 2,483,778 | 10/1949 | Morrell | 260/666.5 |
| 2,947,795 | 8/1960 | Keown | 260/678 |
| 3,683,024 | 8/1972 | Kuntshik | 260/566 |
| 3,879,311 | 4/1975 | Schott et al. | 252/415 |
| 4,101,444 | 7/1978 | Burk et al. | 252/411 R |
| 4,190,554 | 2/1980 | Yamauchi et al. | 252/412 |
| 4,237,326 | 12/1980 | Fuga | 585/4 |
| 4,269,717 | 5/1981 | Slovinsky | 210/750 |
| 4,350,606 | 9/1982 | Cuisia et al. | 252/392 |
| 4,487,745 | 12/1984 | Weiss et al. | 422/16 |
| 4,497,702 | 2/1985 | Miller | 208/47 |
| 4,551,226 | 11/1985 | Ferm | 208/48 |
| 4,556,476 | 12/1985 | Miller | 208/48 |
| 4,927,519 | 5/1990 | Forester | 208/48 |
| 5,100,532 | 3/1992 | Roling et al. | 208/48 |
| 5,213,678 | 5/1993 | Rondum et al. | 208/48 |
| 5,243,063 | 9/1993 | Devicaris et al. | 558/304 |
| 5,282,957 | 2/1994 | Wright et al. | 208/48 |

FOREIGN PATENT DOCUMENTS

| | | | |
|---|---|---|---|
| 1013041 | 1/1989 | Japan | C07C 7/20 |
| 1566106 | 4/1980 | United Kingdom . | |

OTHER PUBLICATIONS

*Advances in Chemistry Series*, "Effect of Additives in Petroleum–Derived Fuels", pp. 238–239.
Product Brochure entitled "Olefins Process Treatment", 1990, Drew Chemical Corporation.
W.N.N. Knight, et al, *Modern Petroleum Technology*, "Cracking and Reforming", pp. 327–344 (1973).
Drew Product Data Sheet, "MEKOR® CG Corrosion Inhibitor", Mar. 1994.
Drew Product Data Sheet, "MEKOR® 70 Corrosion Inhibitor", Mar. 1994.
Drew Product Data Sheet, "MEKOR® 6701 Corrosion Inhibitor", Mar. 1994.
Drew Product Data Sheet, "DREWCOR® 2130 Corrosion Inhibitor", Mar. 1994.
Drew Product Data Sheet, "DREWCOR® 2170 Corrosion Inhibitor", Mar. 1994.
Drew Product Data Sheet, "DREWCOR®6173 Corrosion Inhibitor", Mar. 1994.
Drew Product Data Sheet, "MEKOR® Corrosion Inhibitor", Mar. 1994.
Drew Product Data Sheet, "MEKOR® Corrosion Inhibitor", General, 1990.
Drew Product Data Sheet, "Case History DREWCOR® Corrosion Inhibitor", 1990.
Drew Product Data Sheet, "DREWCOR® 2130 Corrosion Inhibitor", 1990.

*Primary Examiner*—Glenn A. Caldarola
*Assistant Examiner*—Bekir L. Yildirim
*Attorney, Agent, or Firm*—Pollock, Vande Sande & Priddy

[57] ABSTRACT

This invention relates to a process for improving the effectiveness of a refinery process catalyst. The process comprises treating the refinery process catalyst with an effective amount of reducing agent selected from the group consisting of hydrazine, oximes, hydroxylamines, carbohydrazide, erythorbic acid, and mixtures thereof.

7 Claims, 1 Drawing Sheet

PROCESS FOR IMPROVING THE EFFECTIVENESS OF PROCESS CATALYST

This application is a continuation of U.S. patent application Ser. No. 08/252,012, filed Jun. 1, 1994, now abandoned.

TECHNICAL FIELD

This invention relates to a process for improving the effectiveness of a process catalyst. The process comprises treating the process catalyst with a reducing agent selected from the group consisting of hydrazine, oximes, hydroxylamines, carbohydrazide, erythorbic acid, and mixtures thereof.

BACKGROUND OF THE INVENTION

Catalytic reforming is used in the refining of crude oil to increase the yield of higher octane gasoline which sells at higher prices. In catalytic reforming, the paraffins and naphthenes are passed through the reformer with the goal of minimizing cracking. Instead their structure is rearranged to form higher octane aromatics. Essentially catalytic reforming converts low octane paraffins to naphthenes. Naphthenes are converted to higher octane aromatics. Aromatics are left essentially unchanged.

Refineries generally use a platinum catalyst or platinum alloy supported on a silica or silica-aluminum substrate as the reforming catalyst, although other catalysts, including the oxides of aluminum, chromium, molybdenum, cobalt, and silicon can be used.

In the strong reducing environment and elevated temperatures (500° C. to 600° C.) of the reformer, the catalyst becomes contaminated with metals, such as lead, iron, nickel, vanadium, sulfur compounds, arsenic, and coke. The result is that the catalyst becomes inactive and the efficiency of the reformer decreases. In order to reduce contamination of the reformer catalyst, most reformer catalysts have a guard bed for the catalyst which removes contaminants from the feed stream. Over a period of time, contaminants still break through to the reformer catalyst and reduce catalytic activity.

As the activity of the catalyst decreases, the reaction temperature of the reformer is increased to maintain the desired output. Additionally, organic chloride containing compounds are fed to the reformer to reactivate the catalyst on a periodic basis or continuously at a low dosage. The activity of the reformer catalyst is a function of surface area, pore volume, active platinum and organic chloride content. The efficiency of the reformer is reduced during operation by coke deposition, chloride loss, and contaminants such as sulfur, lead, heavy metals, and oxygen.

When the catalyst becomes depleted, it is necessary to regenerate the catalyst. The activity of the catalyst can be restored by high temperature oxidation of the coke followed by chloriding. This regenerative process allows the reformer to operate for up to a 24 month period between regenerations. Normally the catalyst can be regenerated at least three times before it has to be replaced and returned to the manufacturer for reclamation.

SUMMARY OF THE INVENTION

This invention relates to a process for improving the effectiveness of a process catalyst which comprises:

treating said process catalyst with an effective amount of a reducing agent selected from the group consisting of hydrazine, oximes, hydroxylamines, carbohydrazide, erythorbic acid, and mixtures.

Indirect evidence and direct evidence indicates that the treatment of the process catalyst by the subject process reduces or retards the formation of metal contaminants, oxygen, sulfur, and coke on the process catalyst. Thus the process could be alternatively characterized as a process for reducing and/or retarding the contamination of a process catalyst.

Reducing or retarding the contamination of the process catalyst results in the increased effectiveness of the reformer. This is shown by yields across the reformer, higher octane gasoline, and less benzene in the reformate. Moreover, since yields of higher octane gasoline are increased, the refinery can blend lower grade fuels into the gasoline. Furthermore, the reformer can also be operated at lower temperature and pressure thus minimizing coking and cracking while making the same octane gasoline and improving yield. Finally, the refinery can save money and time spent on catalyst regeneration by increasing the life of the catalyst and the time between regenerations.

Process catalysts which benefit from this treatment include reforming, hydrotreating, hydrocracking, isomerization, hydrogenation, and guard bed catalysts. Treating the process catalyst involves adding the reducing agent to a process stream which will enable the reducing agent to come into contact with the process catalyst. Examples of process streams which will provide such contact between the reducing agent and the process catalyst include stripper steam, crude overhead, naphtha, splitter feed, refining feed, and feedlines for chloriding chemicals used in the reformer.

DEFINITIONS AND ABBREVIATIONS

Figure 1:
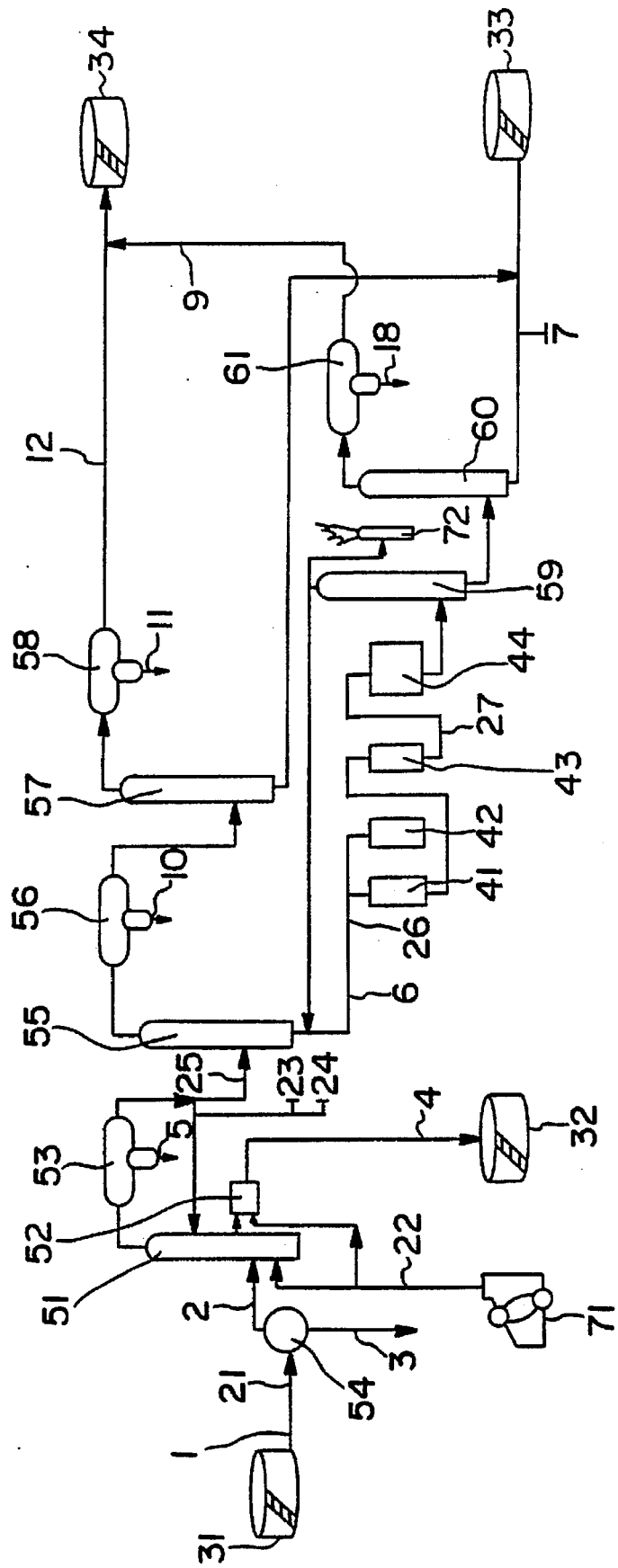
FIG. 1 is a schematic diagram of a simple refinery.

BZE—benzene.

CCAT—catalyst contamination after treatment.

CCBT—catalyst contamination before treatment.

CYH—cyclohexane.

DREWCOR—DREWCOR is a registered trademark of Ashland Oil, Inc. DREWCOR 2130 corrosion inhibitor is chemically defined as a blend of amines and MEKOR such that the amount of MEKOR is about 5 percent by weight.

FEED POINT—place where reducing agent is injected into the sulfur containing hydrocarbon process stream.

REFINERY PROCESS CATALYST—a refinery process catalyst is a catalyst used in refining crude oil, particularly catalysts used in the reforming of gasoline.

REFINERY PROCESS STREAM—any refinery stream which comes into contact with a refinery process catalyst, particularly hydrocarbon streams which flow through the reformer of the refinery and come into contact with the reformer catalyst, most particularly three phase refinery process streams which carry a liquid hydrocarbon phase, a gaseous hydrocarbon phase, and an aqueous phase.

MCP—methyl cylcopentane.

MEKOR—MEKOR is a registered trademark of Ashland Oil, Inc. and is chemically defined as methyl ethyl ketoxime [$H_3C(C$=$=$$NOH)CH_2CH_3$].

MOTOR OCTANE NUMBER (MON)—motor octane number measured by ASTM D-357 and is a guide to engine performance at high speeds or under heavy load conditions.

PETROLEUM PRODUCTS—products produced by refining crude oil including gasoline, diesel fuel, propane, jet fuel, kerosene, propane, naphtha, benzene, gasoline, aniline, etc.

ppm—parts per million MEKOR.

REFORMATE—reformed aromatics, primarily naphtha, which is upgraded in octane by means of catalytic reforming.

RESEARCH OCTANE NUMBER (RON)—research octane number measured by ASTM D-2699. A standardized test engine operating under standardized conditions (600 rpm) is used. Results are comparable to those obtained in an automobile engine operated at low speed.

SAMPLE POINT—place where a sample of a treated hydrocarbon stream is taken to determine if there was a reduction in catalyst contaminants.

SUM $C_6$—sum of compounds having 6 carbon atoms.

$$\frac{R+M}{2} = \text{average of } RON \text{ and } MON.$$

YIELD—a percentage calculated by subtracting the liquid weight of the product that comes out of the reformer from the liquid weight of the feed which goes into the reformer and then dividing by 100.

DETAILED DESCRIPTION OF DRAWING

FIG. 1 illustrates the flow chart of a simple refinery. It shows the sample points 1–12 for the process streams tested, feedpoints for MEKOR 21–27, storage tanks 31–34, reformers 41–44, vessels 51–61, boiler 71, and hydrogen flare 72. Raw untreated crude oil 31 is fed to the desalter 54 where it is desalted and pumped into the crude tower 51. From the crude tower, a crude gasoline fraction is pumped into the raw gas accumulator 53 and then to the splitter tower 55. Fractions of the separated gasoline are pumped from the splitter tower to the depropanizer 57, the reformer 41–44, and to the hydrogen separator 59. The fraction from the hydrogen separator is pumped to the stabilizer tower 60. MEKOR is fed into the process at feedpoints 21–27. Sample points include 1–12. The specific components in FIG. 1 are identified as follows:

| | SAMPLE POINTS |
|---|---|
| 1 | RAW CRUDE |
| 2 | CRUDE OUT OF DESALTER |
| 3 | WATER OUT OF DESALTER |
| 4 | DIESEL TO STORAGE TANK |
| 5 | WATER OUT OF RAW GAS ACCUMULATOR |
| 6 | SPLITTER BOTTOMS |
| 7 | STABILIZER BOTTOMS |
| 8 | WATER OUT OF STABILIZER ACCUMULATOR |
| 9 | STABILIZER PROPANE |
| 10 | WATER OUT OF SPLITTER ACCUMULATOR |
| 11 | WATER OUT OF DEPROPANIZER ACCUMULATOR |
| 12 | DEPROPANIZER PROPANE |
| | CHEMICAL FEED POINTS |
| 21 | MEKOR INTO RAW CRUDE |
| 22 | MEKOR INTO STRIPPING STEAM TO CRUDE TOWER |
| 23 | MEKOR INTO CRUDE TOWER REFLUX |
| 24 | DREWCOR 2130 INTO CRUDE TOWER REFLUX |
| 25 | MEKOR INTO SPLITTER TOWER FEED |
| 26 | 1,1,1 TRICHLOROETHANE INTO REFORMATE FEED |
| 27 | MEKOR INTO REFORMERS |
| | STORAGE TANKS |
| 31 | RAW CRUDE |
| 32 | DIESEL |
| 33 | GASOLINE |
| 34 | PROPANE |
| | REFORMERS |
| 41 | REFORMER #1 |
| 42 | REFORMER #2 |
| 43 | REFORMER #3 |
| 44 | REFORMER #4 |
| | VESSELS |
| 51 | CRUDE TOWER |
| 52 | DIESEL DRIER |
| 53 | RAW GAS ACCUMULATOR |
| 54 | DESALTER |
| 55 | SPLITTER TOWER |
| 56 | SPLITTER ACCUMULATOR |
| 57 | DEPROPANIZER TOWER |
| 58 | DEPROPANIZER ACCUMULATOR |
| 59 | HYDROGEN SEPARATOR |
| 60 | STABILIZER TOWER |
| 61 | STABILIZER ACCUMULATOR |
| | OTHER |
| 71 | BOILER |
| 72 | HYDROGEN FLARE |

DETAILED DESCRIPTION OF THE INVENTION

This process relates to improving the effectiveness of a refinery process catalyst. It is believed this improved effectiveness results because the treatment reduces and/or retards the contamination of the refinery process catalyst. Sources of catalyst contamination are metals, such as lead, iron, vanadium, and nickel, sulfur compounds, arsenic, and coke.

The reducing agents used in this process for improving the effectiveness a process catalyst are selected from the group consisting of hydrazine, oximes, hydroxylamines (such as N,N-diethylhydroxylamine), erythorbic acid, and mixtures thereof. These reducing agents are described in U.S. Pat. Nos. 5,213,678 and 4,350,606 which are hereby incorporated by reference. Preferably used as reducing agents are oximes such as the ones described in U.S. Pat. No. 5,213,678 as having the formula:

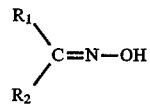

wherein $R_1$ and $R_2$ are the same or different and are selected from hydrogen, lower alkyl groups of 1–8 carbon atoms and aryl groups, and mixtures thereof. Most preferably used as the oxime are aliphatic oximes, particularly methyl ethyl ketoxime.

An effective amount of reducing agent used to improve the effectiveness of the process catalyst will depend somewhat upon the specific result wanted: improvement of the reformer yield, improved yield of high octane gasoline, reduced yield of benzene, reducing or retarding the contamination of the refiner. Actually, all these benefits are interrelated, and it is difficult to relate an effective amount of reducing agent to one of these parameters, or state an exact amount of reducing agent which will relate to all benefits wanted. However, it can be stated in general that an effective amount will range from 5 ppm to 100 ppm of reducing agent based upon the catalyst feed stock which refers to the refinery process stream which comes into contact with the refinery process catalyst, preferably from 50 ppm to 100 ppm. The catalyst feed stock typically consists of splitter bottoms, reformer feed, and process streams entering the reformer catalyst. Preferably the reducing agent is added to the process stream continuously.

The following detailed operating examples illustrate the practice of the invention in its most preferred form, thereby permitting a person of ordinary skill in the art to practice the invention. The principles of this invention, its operating parameters, and other obvious modifications thereof will be understood in view of the following detailed examples.

EXAMPLES

The following examples will illustrate the use of MEKOR to improve the efficiency of a process catalyst used in the reformer of a refinery and the octane rating of the gasoline coming out of the reformer which is typically operated at temperatures of 500° C. to 525° C. and is under a pressure of 200 to 300 psig. The process catalyst was a platinum catalyst arranged on a fixed bed. MEKOR was added to the reformer 41–44 to a pressurized naphtha feed line 25.

The temperature of the naphtha feed line was about 250° C. to about 300° C.

The refinery used to test the effect of adding MEKOR to a process stream was a small refinery which refines approximately 10,000 barrels of crude oil per day. The diagram of the refinery is shown in FIG. 1.

EXAMPLES

Control Examples C1–C3 in Table I show how the catalyst was working in the reformer before adding MEKOR. Examples 1–2 in Table II show how the addition of 50 ppm MEKOR into the naphtha feed line 25 flowing to the splitter tower 55 affected the effectiveness of the catalyst in terms of hours of operation and output.

TABLE I (Control)
(Reformer Length of Operation - Before MEKOR Addition)

| Control Examples | Start of Run | End of Run | Hours of Operation | Throughput Bbls. |
|---|---|---|---|---|
| C1 | 6/21/93 | 7/27/93 | 936 | 66,292 |
| C2 | 7/31/93 | 8/22/93 | 552 | 34,045 |
| C3 | 8/28/93 | 10/5/93 | 960 | 64,227 |
| Average | | | 816 | 54,855 |

TABLE II (Reformer Length of Operation - After MEKOR Addition)

| Example | Start of Run | End of Run | Hours of Operation | Throughput Bbls. |
|---|---|---|---|---|
| 1 | 10/8/93 | 1/11/94 | 2,304 | 149,125 |
| 2 | 1/16/94 | 3/26/94 | 1,668 | 100,238 |
| Average | | | 1,986 | 124,681 |

A comparison of the data in Tables I and II clearly shows that the addition of MEKOR to the reformer more than doubles the hours of operation and barrels of throughput when MEKOR is added to the naphtha process stream feeding the reformer and comes into contact with the reformer process catalyst.

A sample of the reformate leaving the reformer before and after the treatment is measured for octane rating, benzene, and aniline. Table III, IV, and V show how the reformer was operating relative to these outputs before MEKOR was introduced into the reformer. Table IV shows how the reformer operated after adding 75 ppm of MEKOR to the naphtha stream (feedpoint 25) flowing to the reformer.

TABLE III (Control)
Reformer Catalyst Performance Data
Before MEKOR Addition

| Example | Reformer Feed(bpd) | Hours Into Run | Bbls. Thruput Since Startup | Octane $\frac{R+M}{2}$ | Aniline | Yield % |
|---|---|---|---|---|---|---|
| C4 | 1750 | 168 | 9837 | 93.90 | −15 | 77.99 |
| C5 | 1715 | 192 | 11670 | 93.80 | −14 | 78.57 |
| C6 | 1647 | 216 | 13429 | 93.50 | −11 | 79.06 |
| C7 | 1571 | 240 | 15108 | 93.50 | −10 | 79.72 |
| C8 | 1469 | 264 | 16677 | 93.60 | −14 | 81.09 |
| Avg. | 1630 | | | 93.66 | −12 | 79.29 |

TABLE IV (Reformer Catalyst Performance Data - After MEKOR Addition)

| Example | Reformer Feed(bpd) | Hours Into Run | Bbls. Thruput Since Startup | Octane $\frac{R+M}{2}$ | Aniline | Yield % |
|---|---|---|---|---|---|---|
| 3 | 1550 | 132 | 8884 | 93.00 | −12 | 91.24 |
| 4 | 1550 | 156 | 10541 | 93.00 | −10 | 89.75 |
| 5 | 1335 | 180 | 11968 | 97.00 | −25 | 91.99 |
| 6 | 1606 | 252 | 17211 | 97.00 | −20 | 86.55 |
| 7 | 1573 | 276 | 18891 | 97.00 | −20 | 87.74 |
| Avg. | 1523 | | | 95.40 | −17 | 89.45 |

Tables III and IV show the addition of MEKOR increases yield and octane number and decreases the aniline number.

TABLE V

Benzene Produced From Hydrocracking Reaction

| Example | Hexane | MCP | CYH | BZE | Sum C6 | BZE from Hydro-Cracking | MEKOR ppm |
|---|---|---|---|---|---|---|---|
| C10 | 2.337 | 0.367 | 0.030 | 9.245 | 9.642 | 2.508 | 0.0 |
| 10 | 2.462 | 1.010 | 0.045 | 7.120 | 8.175 | 1.041 | 20.0 |

Table V shows that the addition of MEKOR lowers the amount of benzene produced from the hydrocracking reaction. This is significant because future regulations by the Environmental Protection Agency will limit the amount of benzene in gasoline to less than one percent by weight. Furthermore, if higher octane gasoline can be produced in a higher yield with less benzene, undesirable side reactions will be reduced.

We claim:

1. A process for improving the effectiveness of a refinery process catalyst wherein said process catalyst is a catalyst used in the reformer of a refinery operation which comprises:

adding a reducing agent selected from the group consisting of hydrazine, oximes, hydroxylmines, carbohydrazide, erythorbic acid and mixtures thereof to a refinery process stream which contacts said refinery process catalyst in the reformer of a refinery operation in an mount effective to increase the liquid yield across the reformer.

2. The process of claim 1 wherein the reducing agent is contacted with refinery process catalyst by feeding the reducing agent through a refinery process stream selected from the group consisting of stripper steam, crude overhead, naphtha, splitter feed, refining feed, and chloriding chemicals used in the reformer.

3. The process of claim 2 wherein the catalyst is a platinum catalyst.

4. The process of claim 3 wherein said reducing agent is an oxime.

5. The process of claim 4 wherein the amount of reducing agent used is from 5 ppm to 100 ppm based upon the weight of the refinery process stream.

6. The process of claim 5 wherein the oxime is fed into the naphtha stream.

7. The process of claim 6 wherein the oxime is methyl ethyl ketoxime and said methyl ethyl ketoxime is used is an amount of from 50 ppm to 100 ppm based upon the weight of the refinery process stream.

* * * * *